Aug. 2, 1960
N. B. CHRISTENSEN
2,947,322
CONTROL DEVICE FOR VEHICLE PNEUMATIC SUSPENSION
Filed May 4, 1956
2 Sheets-Sheet 1
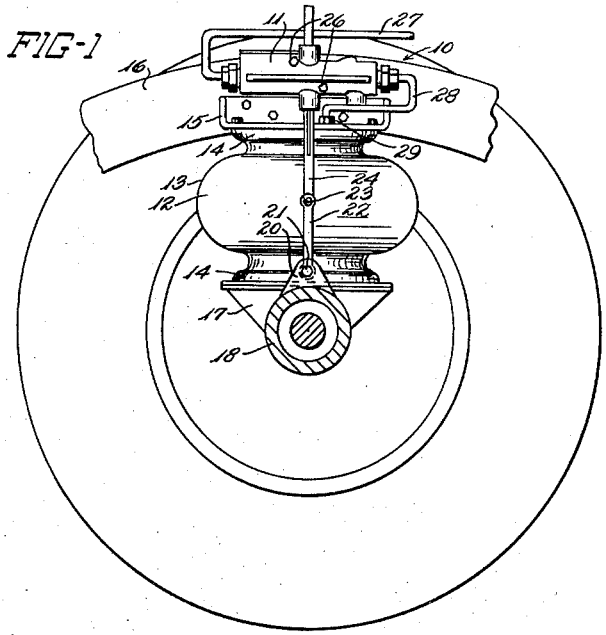
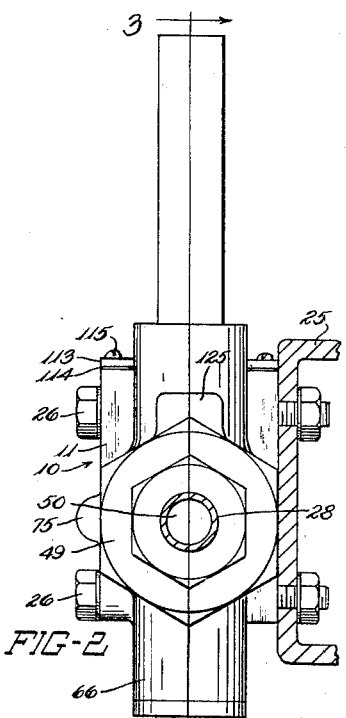
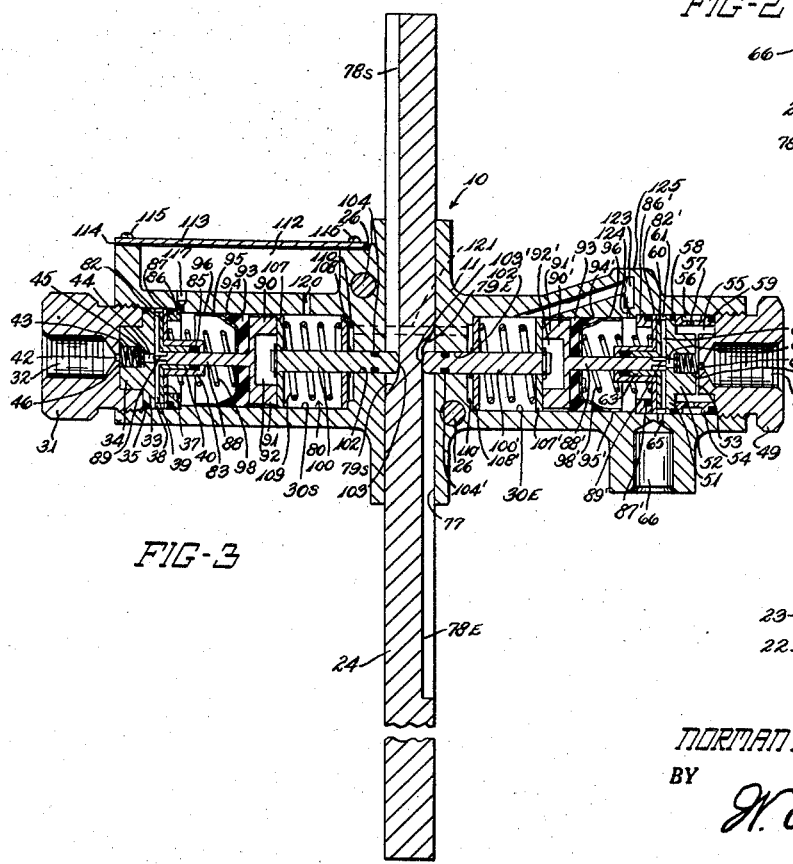
INVENTOR.
NORMAN B. CHRISTENSEN
BY
W. A. Fraser
ATTY.

Aug. 2, 1960  N. B. CHRISTENSEN  2,947,322
CONTROL DEVICE FOR VEHICLE PNEUMATIC SUSPENSION
Filed May 4, 1956  2 Sheets-Sheet 2
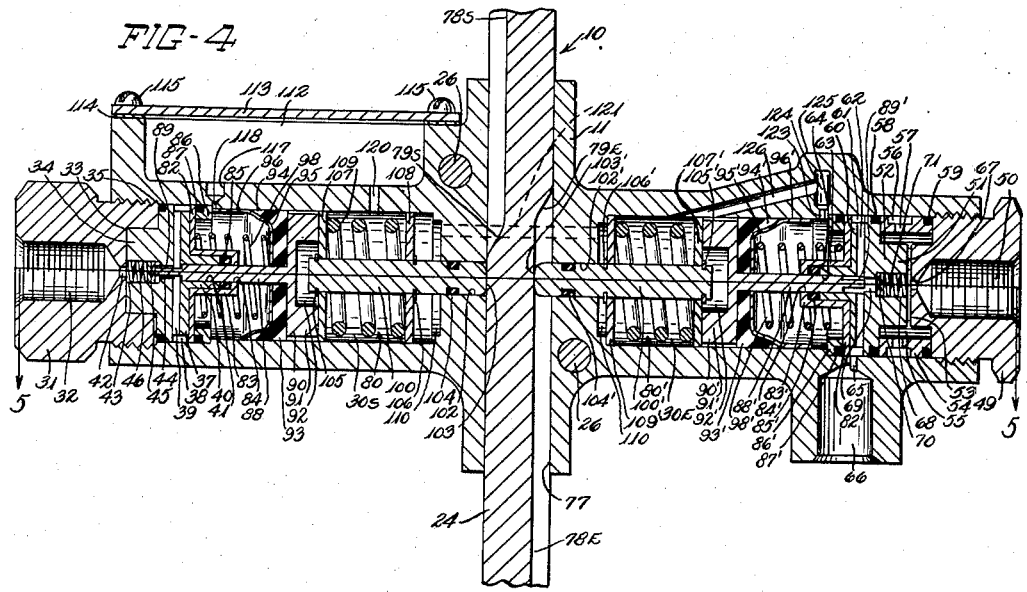
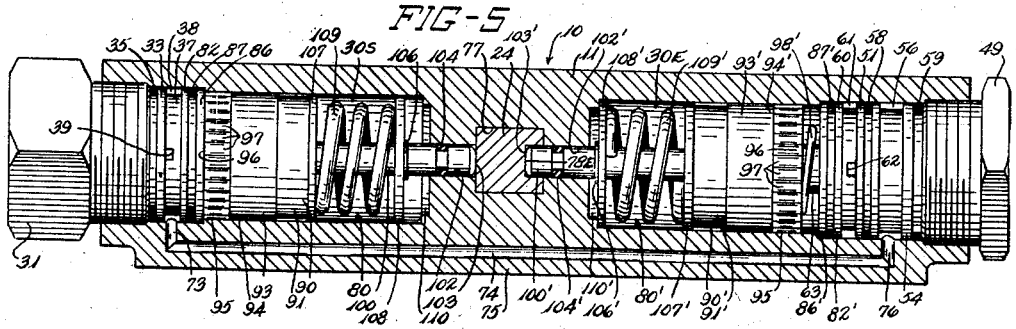
INVENTOR.
NORMAN B. CHRISTENSEN
BY W. A. Fraser
ATTY.

United States Patent Office 2,947,322
Patented Aug. 2, 1960

2,947,322

CONTROL DEVICE FOR VEHICLE PNEUMATIC SUSPENSION

Norman B. Christensen, North Olmsted, Ohio, assignor of one-half to Republic Manufacturing Co., Cleveland, Ohio, and of one-half to The Firestone Tire & Rubber Company, Akron, Ohio, both corporations of Ohio Filed May 4, 1956, Ser. No. 582,745

5 Claims. (Cl. 137—596.2)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs to maintain a predetermined height between the frame and road gear. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or raise, and therefore, air must be exhausted or vented from within the air spring to restore it to its initial position.

In addition to controlling the supply and exhaust of air to and from an air spring, a satisfactory valve control means must embody therein a determinable time delay so that momentary alteration of the static load on the suspension system, such as would be encountered during normal axle movement due to road irregularities, will not cause the valve to supply or exhaust air. This time delay feature is often referred to as "damping" and preferably is selected within a time range of from 1 to 20 seconds, as determined by the weight of the vehicle, road conditions, etc.

The operation of the valve means also must not be influenced by the natural frequency of the vehicle suspension system which will probably be in the range of from 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a novel time delay or "damping" feature, and is operative under extremes of temperature, humidity and other environmental conditions.

A further object is to provide an improved valve and control means located above the vehicle road gear and embodying therein a novel actuating means and a determinable time delay or damping component to prevent excessive operation of the valve, the damping component being accurately responsive to persistent changes in vehicle loading.

These and other objects will be apparent in view of the following detailed description of the invention considered with the attached drawings.

In the drawings:

Fig. 1 is a vertical sectional view through a vehicle axle showing in elevation a portion of the vehicle equipped with a pneumatic suspension system according to the invention;

Fig. 2 is an end view of the valve and control means;

Fig. 3 is a sectional view, taken substantially on line 3—3 of Fig. 2;

Fig. 4 is an enlarged view, similar to Fig. 3, showing the valve and control means in the air supply position; and Fig. 5 is an enlarged section, taken substantially on line 5—5 of Fig. 4.

In the present invention a ride control valve means, indicated generally by the numeral 10, includes an elongated housing 11, generally rectangular in cross section, which carries a damping means, and an air supply and exhaust control means. The housing 11 is located remotely of a conventional air spring bellows 12, of multiply rubber and cord construction and having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened by a similar clamp ring 14 to the upperside of a bracket 17 on the axle housing 18 of the vehicle road gear. One mode of interposing an air spring between a vehicle frame and road gear has been shown and described. It will be understood, however, that the principles of the invention are applicable to air springs interposed in other ways between the frame and road gear. Also, only one air spring has been shown in connection with this invention, but it will be understood that the invention may be utilized with as many air springs as are required on a vehicle.

A stub flange 20, which may be located atop the axle housing 18, has a bolt 21 therethrough pivotally securing the lower end of a valve actuating rod link 22 to the vehicle road gear. The bifurcated upper end of the link 22 is pivotally fastened as at 23 to the lower end of a valve actuating rod 24 extending upwardly through the housing 11 in a manner to be described. The housing 11 is preferably located directly above the axle housing 18, and is fastened (Fig. 2) by suitable means such as a bracket 25 and bolts 26 extending through the housing and bracket to one of the longitudinal frame members 16.

Air, from a source under pressure (not shown), is supplied to the control device 10 by suitable piping 27 having a conventional check valve (not shown) therein so that air cannot back out. The control device is connected by suitable piping 28 to an air spring fitting 29, which extends through the frame member 15 into the interior of the air spring. The piping 28 is the conduit for supplying air to and exhausting air from the air spring 12, through the control device 10, as referred to later.

Referring to Figs. 3, 4 and 5, the housing 11 is provided with identical opposed substantially horizontal central bores or chambers, each opening exteriorly of the ends of the housing. For ease in reference, the central bore associated with the supply of air interiorly of the housing 11 to the bellows 12 is indicated by 30S. The counterpart bore associated primarily with the exhaust of air from the bellows 12 interiorly of the housing 11 is indicated by 30E.

As best shown in the enlarged Fig. 4, threaded into the open end of bore 30S is a fitting 31 having an air supply port 32 into which the piping 27 is adapted to be secured. Inwardly of the fitting 31, the bore 30S has mounted therein a valve ring 33 having an outwardly extended hub portion 34 that fits snugly within the shank portion of fitting 31, and which carries an O-ring 35 at its outer periphery to provide a fluid-tight seal.

Tightly fitted against the inner face of the valve ring 33 is a circular plate 37 of less diameter than the diameter of bore 30S so as to provide an annular space or passage 38 around the plate 37. The outer face of plate 37 is provided with a lateral groove or passage 39 extending thereacross and communicating at either end with the annular passage 38. The inner face of plate 37 is provided with a hub portion 40 having an axial bore 41 extending through the plate 37 for slidably receiving therein a piston rod, as described below.

The air supply port 32 communicates with the annular passage 38 through a small diameter orifice 42 in the end wall of fitting 31, an enlarged diameter valve chamber 43 within the hub 34 of the valve ring 33, and a short smaller diameter bore 44 within the valve ring, concentric with the valve chamber and the axial bore 41, and communicating with the lateral passage 39.

To control the passage of compressed air from the piping 27 to the air spring 12, as described below, a valve 45 is seated at the inner end of chamber 43 against the shoulder provided by the short bore 44. Valve 45 is in the form of a flat, reinforced air impermeable member, and a small coil spring 46, bearing between the valve and fitting 31 has a normal bias tending to keep the valve seated. Valve 45 is suitably shaped to close bore 44 when seated, and may be square, hexagonal, star shaped, round or any other shape that will permit the passage of air around the valve.

Referring still to the enlarged Fig. 4, threaded into the open end of bore 30E is a fitting 49, similar to fitting 31, having a two-way bellows port 50 into which the piping 28 is adapted to be secured. Inwardly of the fitting 49, the bore 30E has mounted therein a valve ring 51, similar to valve ring 33, having an outwardly extended hub portion 52 that is spaced inwardly from the shank portion of fitting 49 a distance sufficient to provide a lateral passage 53. As best shown in Fig. 4, the passage 53 is obtained by utilizing a relatively wide spacing ring 54 between fitting 49 and valve ring 51.

The inner periphery of the spacing ring 54 is of greater diameter than the diameter of the valve ring hub 52 and the shank of the fitting 49 so that an annular space or passage 55 in communication with the lateral passage 53 is provided. The outer periphery of the spacing ring 54 is provided with an annular groove or passage 56 communicating with the inner annular passage 55 by a plurality of radial passages 57. O-rings 58 and 59 are carried at the outer peripheries of the rings 51 and 54, respectively, to provide fluid tight seals.

Tightly fitted against the inner face of the valve ring 51 is a circular plate 60, identical with plate 37, of less diameter than the diameter of bore 30E so as to provide an annular space or passage 61, identical with passage 38. The outer face of plate 61 is provided with a lateral groove or passage 62, identical with passage 39, extending thereacross and communicating at either end with the annular passage 61. The inner face of plate 60 is also provided with a hub portion 63 having an axial bore 64 extending through the plate 60 for slidably receiving a piston rod, as described below.

The annular passage 61 is at all times in communication through a small diameter orifice 65 in the housing 11 with an exhaust port 66 vented to the atmosphere.

The bellows port 50 communicates with the annular passage 61 through a small diameter orifice 67 in the end wall of fitting 49, the lateral passage 53, an enlarged diameter valve chamber 68 within the hub 52 of the valve ring 51, and a short smaller diameter bore 69 within the valve ring, concentric with the valve chamber and the axial bore 64, and communicating with the lateral passage 62.

To control the passage of exhaust air from the air spring 12 to the exhaust port, as described below, a valve 70 is seated at the inner end of chamber 68 against the shoulder provided by the short bore 69. Valve 70 is identical with valve 45 and is normally seated to close bore 69 by a small coil spring 71 bearing between the valve and the fitting 49.

Thus, to vent air from within the air spring to the atmosphere, the air passes through fitting 29, piping 28, fitting 49, bellows port 50, orifice 67, lateral passage 53, chamber 68, past valve 70, through small bore 69, lateral passage 62, annular passage 61 and orifice 65, to the exhaust port 66.

As described above, the annular passage 38 communicates with the air supply port 32. Referring to Fig. 5, the passage 38 communicates with a short lateral passage 73 that leads to one end of an elongated passageway 74 extending transversely of the housing 11 within a lateral extension 75 (Fig. 2) of the housing. The other end of passageway 74 opens into another short lateral passage 76 which is at all times in communication with the annular passage 56.

Thus, compressed air is supplied to the air spring 12 from the piping 27 by passing through the fitting 31 and supply port 32, past valve 45 to the annular passage 38, all as described above; and then from the passage 38 through short passage 73, passageway 74, short passage 76, annular passage 56, radial passages 57, annular passage 55, lateral passage 53, orifice 67, bellows port 50, fitting 49, piping 28 to fitting 29.

Air is supplied to or exhausted from the air spring 12, under conditions described below, as a result of relative movement interiorly of the housing 11 between the latter and the actuating rod 24. The actuating rod is preferably substantially square in cross section and is journaled in a square bore 77 extending vertically through the housing between the bores 30S and 30E. The side of rod 24 facing toward bore 30S is provided with longitudinal groove 78S terminating at its lower end in an outwardly directed cam surface 79S. The side of rod 24 facing bore 30E is provided with a similar groove 78E and cam surface 79E. When the housing 11 is moved vertically, the cam surfaces 79S or 79E will cause selective movement within the bores 30S or 30E of valve actuating means indicated generally by the numeral 80.

In the preferred embodiment of the control device 10 as shown and described, the several elements of the actuating means 80 unseating valve 45 to admit air under pressure to the air spring 12 have substantially identical counterparts unseating valve 70 to exhaust air from the air spring. Hence, to avoid repetition of description the elements actuating valve 45 will be described in detail, and their identical counterparts actuating valve 70 will be indicated by the same numerals, but primed.

As best shown in the enlarged Fig. 4, at the outer end of bore 30S a piston face plate 82 is tightly fitted within bore 30S in abutting contact with the inner face of the circular plate 37. The face plate 82 provides the inner wall of annular passage 38, has a hub portion 83 fitting over the hub portion 40 of the circular plate and has an aperture 84 registering with the axial bore 41 in the circular plate. A small O-ring 85 is placed between the hub portions 40 and 83, surrounding bore 41, to provide a fluid tight seal.

The face plate 82 is held against the plate 37 by a spacer ring 86 carrying an O-ring 87 on its outer periphery to provide a fluid tight seal and seated at its inner surface against a ledge or shoulder in bore 30S. Each of the above described elements in this portion of bore 30S, that is, the valve ring 33, the circular plate 37, the face plate 82 and the spacer ring 86 are properly held in place by tightening fitting 31.

Referring momentarily to bore 30E, the spacing ring 54, the valve ring 52, the circular plate 60, the piston face plate 82' and the spacer ring 86' are held properly in place by tightening fitting 49.

The valve 45 is unseated by a piston rod 88 inserted within bore 41 of the circular plate 37, through aperture 84, and having a reduced outer stem or end 89 extending across lateral groove 39 and into the small bore 44 of the valve ring 33. The valve 70 is unseated by a piston rod 88' inserted within bore 64 of the circular plate 60, through aperture 84', and having a stem 89' extending across lateral groove 62 and into the small bore 69 of the valve ring 51.

Attached to the inner end of the piston rod 88 is a piston plate 90 of less diameter than the diameter of bore 30S and having an integral inwardly directed circumferential flange 91 providing a recessed area 92 in the inner face of the piston plate. Surrounding the piston rod 88 and in abutting contact with the outer face of the piston plate 90 is a piston cup 93.

The piston cup 93 is preferably formed of neoprene, or other suitable material which will not deteriorate in hydraulic fluid or oil, and has a circumferential lip 94 directed toward the spacer ring 86. The piston cup is held against the piston plate 90, with the lip 94 normally tightly pressed against the walls of bore 30S providing a fluid tight seal, by a preformed resilient metallic cup 95. The metallic cup 95 has a circumferential lip 96 which is corrugated to provide a plurality of horizontal passages 97 (Fig. 5), between the corrugations, for a purpose described below.

A coil spring 98, surrounding the piston rod 88, is seated between the face plate 82 and the metallic cup 95 and has a normal bias holding the piston cup 93 against the piston plate 90 and strongly urging the piston structure of the actuating means 80, including the piston rod 88 and valve actuating stem 89, the metallic cup 95, the piston cup 93 and the piston plate 90, away from the valve 45 axially of the fluid filled bore 30S.

The piston structure, described above, is moved toward the valve 45 by elements of the actuating means 80 which include a plunger 100. The plunger 100 is axially movable of the housing 11 within a small bore 102 connecting the inner end of bore 30S with the vertical bore 77. The projecting end 103 of the plunger fits within groove 78S of the actuating rod 24 and is rounded so as to permit displacement of the plunger by the cam surface 79S. An O-ring 104 surrounding the plunger within bore 102 provides a fluid tight seal.

Within bore 30S, the medial portion of the plunger 100 is fitted with a clip 106 or other suitable shoulder-like projection. Fitted on the innermost end of the plunger which projects in the area 92 of the piston plate is a similar clip 105. Between the clips 105 and 106, and movably supporting the plunger within bore 30S, are similar hub plates 107 and 108, each having a diameter slightly less than that of the bore. Seated between the hub plates 107 and 108, surrounding the plunger, is a coiled compression spring 109 biased so as to urge the hub plate 107 against the flange 91 of the piston plate and the hub plate 108 against the shoulder provided by a recess 110 at the innermost end of bore 30S. The spring 109 is so chosen that the strength thereof is sufficient to force the hub plates 107 and 108 against their respective seats as shown in Fig. 3. However, the strength of the spring 109 is not sufficient to cause displacement of the piston structure, described above, toward valve 45 until the plunger 100 is displaced interiorly of the bore 30S by the actuating rod 24.

The elements of the actuating means 80 which accomplish the unseating of valve 70 to exhaust air from within the air spring are indicated by the numerals 82'–109', inclusive. Also, the recess 110' at the innermost end of bore 30E is similar to recess 110.

As best shown in the enlarged Fig. 4, the hydraulic or other suitable fluid which damps or opposes movement of the actuating means 80 within bore 30S and 30E is supplied from a reservoir or chamber 112 in the upper portion of the housing 11 above bore 30S. The chamber is closed by a removable top plate 113 secured to the housing by a gasket 114 and suitable screws 115.

Leading downwardly from chamber 112 is a small diameter port 117 having a reduced diameter orifice 118 in communication with bore 30S adjacent the inner face of the spacer ring 86. A fluid supply port 120 leading downwardly from chamber 112 is in communication with the bore 30S inwardly of the piston structure in the area between the hub plates 107 and 108. A horizontal port 121 (shown in dotted lines Figs. 3 and 4) connects recesses 110 and 110' to supply fluid from the chamber 112 to bore 30E.

Leading upwardly from within bore 30E adjacent the spacer ring 86' is a chamber 123 and small diameter orifice 124 similar to orifice 118. The chamber 123 is within a small boss 125 on the housing 11 and a fluid supply port 126 extends diagonally downwardly therefrom opening into bore 30E between the hub plates 107' and 108'.

The operation of the control device 10 is as follows:

Assume that the static load in the vehicle suspension requires that the air spring 12 be inflated to a pressure of about 50 p.s.i. At this pressure, valve 45 will be seated against bore 44 by spring 46 and valve 70 seated against bore 69 by spring 71.

Now then, assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the housing 11 also moves downwardly relatively to the actuating rod 24 which substantially maintains a fixed position, the link 23 permitting the rod to pivot slightly in the event of limited lateral movement of the axle housing 18 in relation to the frame members.

As shown in the drawings, an increased load will cause the housing 11 to move vertically downward from the position shown in Fig. 3, to that position shown in Fig. 4. Thus, the end 103 of the plunger which has been within groove 78S will be engaged by cam surface 79S and displaced interiorly of the housing; to the left as viewed in Figs. 3 and 4. While the plunger 100 is being displaced, the counterpart plunger 100' will remain stationary because the plunger end 103' remains in groove 78E.

When the plunger 100 is displaced to the left, the ring 106 will cause the hub plate 108 to move to the left compressing spring 109. The spring 109 will resist the compression force by reacting against the flange 91 of the piston plate 90. The piston plate will in turn react against the piston cup 93 so as to cause the piston rod 88 to move to the left compressing spring 98. During such movement, the lip 94 of the piston cup will flare outwardly into fluid tight engagement with the walls of the bore 30S.

As indicated above, the bore 30S is fluid filled. As the piston structure moves to the left, fluid will be displaced ahead of the piston cup 93 (and metallic cup 95)

upwardly through the orifice 118 and port 117 into the supply chamber 112 which is already substantially filled with fluid. The rate at which the area ahead of the piston structure is reduced in volume, and thus the speed of movement of the piston rod 88 to the left, is determined by the size of orifice 118. As fluid is thus displaced, an equivalent amount is returned to bore 30S behind the moving piston structure through port 120.

As the piston rod 88 moves to the left, so does the reduced stem 89, which will pass through the small bore 44 unseating valve 45 and allowing additional air to pass into the lateral groove 39, and then through the various conduits to the air spring 12. This additional air must be under greater pressure than the air already in the air spring and will extend the air spring to its initial or predetermined position.

As the air spring extends, the frame members 15 and 16 move upwardly from the axle housing 18, causing the housing 11 to be moved upwardly relative to the rod 24. As the housing 11 begins to assume the normal position shown in Fig. 3, the cam surface 79S will no longer be in contact with the plunger end 103 and spring 109 will urge the hub plate 108 to the right and the plunger 100 into groove 78S. Thus, the force which had been urging the piston rod 88 to the left will be reversed in direction and the spring 98 is free to urge the piston structure to the right.

As the piston structure moves to the right, the area to the left of the piston 93 will become enlarged in volume so that fluid from chamber 112 is free to return. However, the rate of fluid return through orifice 118 is extremely slow. This factor is obviated by the lip 94 of the piston cup 93 which will collapse slightly when the piston structure is moved away from the valve 45 and allow the flow of fluid past the piston cup and through the radial passages 97 on the metallic cup 95 into the enlarging area ahead of the piston structure. This action moves the reduced stem 89 to the right and allows spring 46 to close valve 45, stopping the flow of additional air and maintaining the restored position of the air spring.

As the piston structure moves to the right in bore 30S, excess fluid will be returned through port 120 to the supply chamber 112. An incidental advantage of this particular feature is that in the event the fluid in bore 30E is low, additional fluid will be forced thereinto through the connecting port 121.

If the static load on the vehicle suspension is decreased, the frame members 15 and 16 move upwardly from the axle housing 18, causing the air spring to extend. During this upward movement of the frame members, the housing 11 also moves upwardly, relatively to the actuating rod 24, which remains substantially fixed as before.

As the housing 11 is moved vertically upward, the ensuing action is similar but in directions opposite to that described above in connection with the action of valve 45. That is, the plunger 100' is moved to the right and the spring 109' causes the hub plate 107', the piston plate 90', the piston cup 93', the piston rod 88', and the reduced stem 89' to also move to the right, compressing spring 98' and unseating valve 70. This movement is damped by fluid which must be forced through orifice 124 into chamber 123, from which it returns through passage 126. As valve 70 is unseated, exhaust air is free to pass from the air spring 12 through the various conduits to the exhaust port 66 and the atmosphere. The exhaust of air from within the air spring will contract the air spring to its normal or predetermined position.

As the air spring contracts, the frame members 15 and 16 move downwardly toward the axle housing 18, causing the housing 11 to be returned to the normal position shown in Fig. 3. The ensuing action is similar to that described above in connection with the closing of valve 45. That is, the force moving plunger 100' is reversed in direction, the piston structure within bore 30E is moved from the valve 70 and the displaced fluid is returned to the area ahead of the piston structure. This action allows spring 71 to close valve 70, stopping the exhaust of air and maintaining the restored position of the air spring.

When a vehicle equipped with a suspension system according to the invention is driven over rough roads with no change in the static loading, the vehicle wheels tend to move up and down over bumps and into holes in the road. This causes the housing 11 to be moved vertically relatively to the rod 24 in either direction as the case may be. However, such quick movements are initially absorbed by the springs 109 or 109' which allow the plungers 100 or 100' to extend briefly into areas 92 or 92' of the piston heads 90 or 90'. Only when a force is maintained in one direction for a predetermined period of time as controlled ultimately by the size of fluid orifices 118 and 124, will the various components of the control device 10 react to supply or exhaust air.

After springs 98 and 98', and 109 and 109' are balanced, it will be found desirable to have orifices 118 and 124 with a diameter providing a time lag of about 7 seconds before the valves 45 and 70 are opened. However, the time delay for both valves need not be the same and may be selected from any place within the preferred range of from 1 to 20 seconds.

A shut off valve (not shown) can be provided in the air spring line 28 so that a mechanic can shut off the line when raising the vehicle by a jack or hoist to remove a tire.

While a preferred embodiment of the invention has been shown and described, it will be understood that changes and modifications may be made therein without departing from the spirit of the invention or the scope of the subjoined claims.

What is claimed is:

1. Control means adapted for regulation of the supply and exhaust of air to and from an expansible bellows for a vehicle suspension system to maintain a predetermined height between the road gear and frame of a vehicle, comprising, an elongated housing having a medial transverse bore, two opposed longitudinal bores communicating at their inner ends with said transverse bore, and interior conduits in said housing for the passage of air to and from a bellows, valve means adjacent the outer end of each longitudinal bore for regulating air flow through said conduits, a piston means in each longitudinal bore between a valve means and said transverse bore, a piston rod extending from said piston means to said valve means in each longitudinal bore, a piston actuating means in each longitudinal bore extending into said transverse bore, a rod slidable in said transverse bore and having opposed surfaces for selective displacement away from said rod of one of said actuating means at a time when said housing is moved along said rod by an external force, and a damping means in said housing opposing movement of said pistons for a predetermined time following displacement of a piston actuating means.

2. Control means adapted for regulation of the supply and exhaust of air to and from an expansible bellows for a vehicle suspension system to maintain a predetermined height between the road gear and frame of the vehicle, comprising, an elongated housing having a medial bore extending transversely therethrough and two opposed bores communicating at their inner ends with said medial bore and extending longitudinally of the housing, a rod mounted within said medial bore, said rod having opposed lateral cam surfaces, separate and opposed valves at the outer end of each of said opposed bores, separate and opposed pistons within each of said opposed bores interiorly of said valves, each said piston having a piston rod extending to its respective valve, separate and opposed piston actuating means within each of said opposed bores interiorly of said pistons, each of said actuating means having an end portion normally biased so as to extend into said medial bore and contact said rod, said cam surfaces on said rod adapted for the selective displacement away from said medial bore of one of said actuating means at a time upon movement of said housing in response to an external force.

3. Control adapted for regulation of the supply and exhaust of air to and from an expansible bellows for a vehicle suspension system to maintain a predetermined height between the road gear and frame of the vehicle, comprising: an elongated housing having a medial bore extending transversely therethrough and opposed longitudinal first and second bores, said first and second bores each having a closure at their outer end and a reduced diameter passage at their inner end communicating with said medial bore; an air supply port opening interiorly of said first bore through a closure; a two-way port opening interiorly of said second bore through a closure and adapted for connection with the interior of a bellows; supply conduits interiorly of said first and second bores and said housing providing for the passage of air from said supply port to said two-way port; a first valve within one of said supply conduits in said first bore normally blocking said passage of air from said supply port; an exhaust port opening exteriorly of said second bore and inwardly of the supply conduits in said second bore; exhaust conduits communicating with said supply conduits in said second bore and providing for the passage of air from said two-way port to said exhaust port; a second valve within one of said exhaust conduits in said second bore normally blocking passage of air to said exhaust port; opposed pistons within each of said bores interiorly of said valves, each said piston having a piston rod extending to its respective valve; opposed piston actuating means within each of said bores interiorly of said pistons, each of said actuating means having an end portion normally biased so as to extend through said reduced diameter passage into said medial bore; a flat-sided rod mounted within said medial bore, said rod having opposed cam surfaces adapted for the selective displacement away from said medial bore of one of the end portions of said actuating means at a time upon movement of said housing in response to an external force; and, damping means opposing the movement of said pistons for a predetermined period of time.

4. Control means adapted for regulation of the supply and exhaust of air to and from an expansible bellows for a vehicle suspension system to maintain a predetermined height between the road gear and frame of the vehicle, comprising: an elongated housing having a medial bore extending transversely therethrough and opposed longitudinal substantially fluid filled first and second bores, interconnected by a fluid transfer conduit, said first and second bores each having a closure at their outer end and a reduced diameter passage at their inner end communicating with said medial bore; an air supply port opening interiorly of said first bore through a closure; a two-way port opening interiorly of said second bore through a closure and adapted for connection with the interior of a bellows; a first hollow member within said first bore and having interior conduits communicating with said supply port; a second hollow member within said second bore and having interior conduits communicating with said two-way port; supply conduits interiorly of said housing communicating with the interior conduits of said first and second hollow members to provide for the passage of air under pressure from said supply port to said two-way port; a first valve within said first hollow member normally blocking the passage of air to said two-way port; an exhaust port opening exteriorly of said second bore inwardly of said second hollow member; said exhaust port communicating with the interior conduits of said second hollow member to provide for the passage of air under pressure from said two-way port to said exhaust port; a second valve within said second hollow member normally blocking the passage of air to said exhaust port; identical opposed pistons within each of said bores inwardly of said hollow members, having head portions selectively movable within each bore and rod portions extending outwardly of said head portions and adapted to unseat said valves; identical opposed piston actuating members within each of said bores inwardly of said pistons and having a plunger normally biased through said reduced diameter passage into said medial bore; a substantially fluid filled chamber within said housing above said first and second bores; restricted fluid filled passageways extending upwardly within said housing from the outer end of each of said bores adjacent one of said hollow members, and from the medial portion of each bore inwardly of each of said piston heads, said passageways, fluid filled chamber and fluid transfer conduit defining a fluid filled circuit; and, a rod mounted within said medial bore, said rod having opposed cam surfaces adapted for the selective displacement away from said medial bore of one plunger at a time upon movement of said housing in response to an external force.

5. Control means adapted for regulation of the supply and exhaust of air to and from an expansible bellows for a vehicle suspension system to maintain a predetermined height between the road gear and frame of the vehicle, comprising: an elongated housing having a medial bore extending transversely therethrough and opposed longitudinally substantially fluid filled first and second bores interconnected by a fluid transfer conduit, said first and second bores each having a closure at their outer end and a reduced diameter passage at their inner end communicating with said medial bore; an air supply port opening interiorly of said first bore through a closure; a two-way port opening interiorly of said second bore through a closure and adapted for connection with the interior of a bellows; a first hollow member within said first bore and having interior conduits communicating with said supply port; a second hollow member within said second bore and having interior conduits communicating with said two-way port; supply conduits interiorly of said housing communicating with the interior conduits of said first and second hollow members to provide for the passage of air under pressure from said supply port to said two-way port; a first valve within said first hollow member normally blocking the passage of air to said two-way port; an exhaust port opening exteriorly of said second bore inwardly of said second hollow member; said exhaust port communicating with the interior conduits of said second hollow member to provide for the passage of air under pressure from said two-way port to said exhaust port; a second valve within said second hollow member normally blocking the passage of air to said exhaust port; identical opposed pistons within each of said bores inwardly of said hollow members, each of said pistons including a resilient cup the lips of which are in fluid tight contact with the walls of said bore when said cup is moved toward one of said valves, said lip collapsing when said cup is moved toward one of said valves, each of said pistons further having a head portion cooperating with said cup, a rod portion extending outwardly of said head portion and adapted to unseat said valves, and spring means seated between said hollow members and said resilient cups and biased so as to normally urge said head portions away from said valves; identical opposed piston actuating members within each of said bores inwardly of said pistons and having a plunger normally biased through said reduced diameter passage into said medial bore; a substantially fluid filled chamber within said housing above said first and second bores; restricted fluid filled passageways extending upwardly within said housing from the outer end of each of said bores adjacent one of said hollow members, and from the medial portion of each bore inwardly of each of said piston heads, said passageways, fluid filled chamber and fluid transfer conduit defining a fluid filled circuit; and, a rod movable within said medial bore, said rod having opposed cam surfaces adapted for the selective displacement away from said medial bore of one plunger at a time upon movement of said housing in response to an external force.

References Cited in the file of this patent

UNITED STATES PATENTS

| | | |
|---|---|---|
| 1,371,648 | Schmidt | Mar. 15, 1921 |
| 1,664,510 | Hughes | Apr. 3, 1928 |
| 2,361,575 | Thompson | Oct. 31, 1944 |
| 2,557,287 | Hormann | June 19, 1951 |
| 2,567,774 | Le Clair | Sept. 11, 1951 |
| 2,596,587 | Morton | May 13, 1952 |
| 2,665,251 | Mendenhall | Jan. 5, 1954 |
| 2,670,201 | Rossman | Feb. 23, 1954 |

FOREIGN PATENTS

| | | |
|---|---|---|
| 565,232 | Great Britain | Nov. 1, 1944 |